United States Patent Office 3,186,894
Patented June 1, 1965

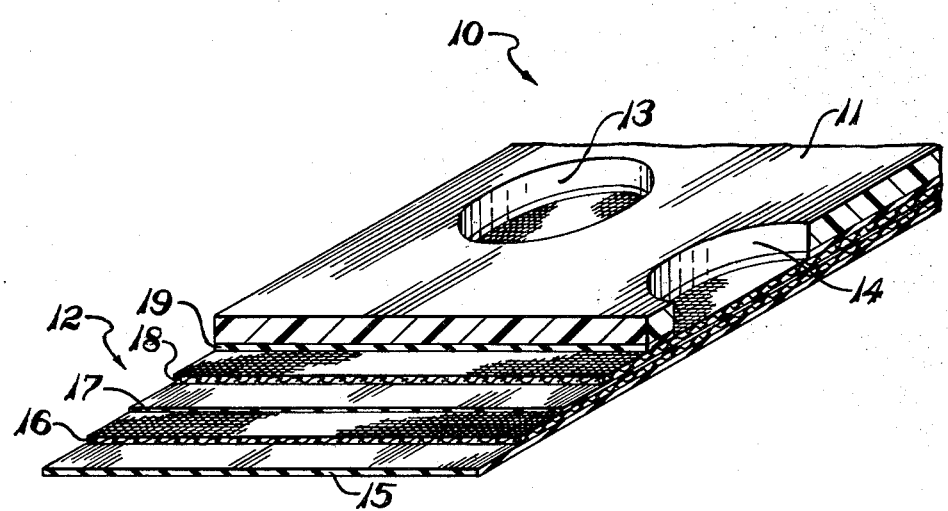
INVENTORS
LEWIS R. LILES
BY HAROLD H. GEIGER

3,186,894
ENGRAVING GUM
Lewis R. Liles, Cuyahoga Falls, and Harold H. Geiger, North Canton, Ohio, assignors to The B. F. Goodrich Company, New York, N.Y., a corporation of New York
Filed Feb. 20, 1961, Ser. No. 90,551
5 Claims. (Cl. 161—84)

This invention relates to the art of printing and, more particularly, to improvements in the material known in that art as engraving gum.

The printing of many materials, such as fabrics, papers of rough surface, straw board containers, wood, and similar substances of somewhat irregular surfaces, requires the use of printing plates formed of a resilient material so that the impression surface can more nearly conform to the surface which is to be printed. Moreover, since printing is more rapidly effected by rotating surfaces than by flat plates, it is desirable that the printing member be such that it can be conformed to the cylinder of a rotary printing press. Sheet material for forming printing members or plates of this type has been available heretofore under the name of engraving gum. Such material generally comprises a composite of elastomer and reinforcing material with the latter being either one or more plies of textile fabric, cellulose sheets, or other flexible materials so that the composite has some resiliency as well as the requisite flexibility. The impression or printing face of such materials has generally been formed of rubber which has only a limited adhesion to the backing so that portions of the impression face may be readily removed by cutting around the periphery of the area to be removed and then peeling or stripping the thus outlined area from the backing.

The use of engraving gums of the types heretofore available have had a number of disadvantages among which have been relatively short life, difficulty of cleaning without injury of the material, and difficulty in securing uniform ink coverage of the printing areas during the printing operation. Hence, use of engraving gums has not enjoyed the popularity or achieved the potential degree of utility which is theoretically possible for such substances. These difficulties have, in a large measure, been due to the fact that the materials heretofore employed for the engraving gums have not had adequate abrasion resistance nor sufficient resistance to hydrocarbons commonly employed in inks or as cleaning solvents so as to resist reaction therewith and injury therefrom.

The principal object of this invention is, therefore, to provide an improved engraving gum which has superior abrasion and solvent resistance, increased life, and facilitates more uniform distribution of printing ink thereover and more uniform release of ink therefrom than can be achieved with rubber surfaced gums.

A further object of the invention is to provide an improved engraving gum which has longer press life and can be operated at press speeds greater than is possible with engraving gums having a natural or synthetic rubber impression surface.

A more specific object of the invention is to provide an improved engraving gum in which the impression layer is a carvable, oil-resistant, flexible, synthetic resin that resists ink build-up thereon and is strippably united with a supporting body comprising elastomer coated reinforcing and elongation resisting fabric.

A still more specific object of the invention is to provide an improved engraving gum wherein the impression layer is formed of plasticized polyvinyl chloride containing a small proportion of paraffin wax, which layer is strippably united with a reinforcing fabric by a layer of a carbon black containing copolymer of butadiene and acrylonitrile.

Other objects and advantages of the invention will be apparent to those skilled in the art to which it pertains from the following detailed description of a preferred embodiment, and certain modifications thereof, described with reference to the accompanying drawing, forming a part of this application, in which the single figure is a fragmentary perspective view to an enlarged scale of a strip of engraving gum embodying the invention with parts being cut away and the edges shown in section to more clearly illustrate the construction.

The strip of engraving gum 10, illustrated in the drawing, comprises a carvable impression surface 11 which is strippably united with a supporting body 12. The impression surface 11 is readily cut or carved by engraving tools, knives, or the like, to provide a configuration representative of the printing which is to be effected thereby, it being understood that the non-removed surfaces of the layer 11 are those which will receive ink and effect the printing operation whereas the removed areas are not thus supplied with ink and represent the non-printing areas in the completed plate or strip. In the strip shown in the drawing, the non-printing surface depressions or recesses 13 and 14 are provided by severing the periphery of the material which was in these areas from the adjacent portions of surface 11 with a knife or other engraving tool, the severed material thereafter being peeled or stripped from the supporting body 12.

The supporting body 12 is preferably such as to have a resilient nature without, however, partaking of substantial dimensional distortion. Moreover, this supporting body must be resistant to oils of the type employed in printing inks and to the solvents commonly employed in cleaning printing plates. Therefore, the supporting body 12 is preferably formed of one or more layers of elastomer coated woven fabric of low extensibility and provided with a backing layer and one or more cushioning layers of oil-resistant elastomer.

In the illustrated embodiment, the supporting body 12 comprises a backing layer 15 which is formed of an oil-resistant elastomer as, for example, a nitrile rubber. This layer 15 is united with a fabric layer 16 which is preferably a square-woven fabric of textile material that has been dipped in a thermosetting resin and then friction coated with elastomer. The side of the fabric 16, opposite that which is united with the layer 15, is united to one side of a filler layer 17 of elastomer with the other side of this layer united to a second elastomer coated fabric 18. The fabric 18 may be of the same weave and textile composition as the fabric 16 and is friction coated with elastomer but is not dipped with the thermosetting resin. This fabric 18 is at the stripping level of the engraving gum and, hence the side of the fabric opposite that united with the filler layer 17 is provided with a stripping coating or ply 19 of elastomer which is capable of firm adhesion to the back of the impression layer 11 but which can be readily separated from fabric 18 by the application of a tearing force.

The impression layer 11 is required to be resistant to oil and other hydrocarbons used in printing inks or as ink removing solvents. Hence, in accordance with this invention, this layer is formed of a carvable, flexible, synthetic resin that is so compounded as to resist build-up of ink thereon. In the preferred embodiment, this material is a plasticized polyvinyl chloride containing a small quantity of paraffin wax.

A specific example of improved engraving gum made in accordance with the illustrated embodiment of the invention had an impression layer 11 of the following composition:

|  | Parts |
|---|---|
| Geon 101 (polyvinyl chloride resin sold by the B. F. Goodrich Chemical Company) | 100.00 |
| Plasticizers | 97.00 |
| Stabilizers | 3.00 |
| Petroleum wax | 0.50 |
| Pigments | 7.10 |
|  | 207.60 |

In the above composition, the plasticizers comprise tricresyl phosphate and dioctyl phthalate. The stabilizers were barium cadmium laurate and triphenyl phosphate. The petroleum wax was that sold under the name Aristowax by Petroleum Specialties, Inc., and the color imparting pigments were such as to provide the desired color for the impression layer. All proportions are given on the basis of parts by weight based on the weight of the polyvinyl chloride. The impression layer had a thickness of 0.112 inch while the total thickness of the strip of engraving gum was in the order of 0.187 inch.

The elastomeric backing layer 15 of that strip had the following composition:

|  | Parts |
|---|---|
| Hycar 1042 (a copolymer of butadiene and acrylonitrile sold by the B. F. Goodrich Chemical Company) | 100.0 |
| Accelerator | 4.0 |
| Zinc oxide | 20.0 |
| Stearic acid | 1.0 |
| Carbon black | 130.0 |
| Sulfur | 5.0 |
| Dibutyl phthalate | 36.5 |
|  | 296.5 |

In the above composition, all parts were based on 100 parts by weight of the elastomer.

Both the fabric 16 and the fabric 18 were square-woven from cotton threads and each comprised a single ply. The fabric layer 16 was dipped in a thermosetting phenolic resin to provide dimensional stability. It was thereafter friction coated on both sides with a nitrile rubber compound which had the following composition:

|  | Parts by weight |
|---|---|
| Hycar 1042 (a copolymer of butadiene and acrylonitrile sold by the B. F. Goodrich Chemical Co.) | 100.00 |
| Accelerators | 3.50 |
| Zinc oxide | 5.00 |
| Carbon black | 25.00 |
| Magnesium carbonate | 25.00 |
| Sulphur | 3.00 |
| Tackifier | 21.00 |
| Dibutyl phthalate | 45.00 |
|  | 227.50 |

The fabric 18 was similarly friction coated but was not dipped.

The filler layer 17 was, like the backing layer 15, oil resistant and was a nitrile compound which had the following composition:

|  | Parts by weight |
|---|---|
| Hycar 1042 (a copolymer of butadiene and acrylonitrile sold by the B. F. Goodrich Chemical Company) | 100.00 |
| Stearic acid | 0.75 |
| Zinc oxide | 4.00 |
| Carbon black | 104.00 |
| Accelerators | 13.65 |
| Plasticizer | 30.00 |
|  | 252.40 |

In the above composition the accelerators included sulfur and p-coumarone and the plasticizer was dibutyl phthalate.

The stripping coating or ply 19 employed between the fabric 18 and the impression layer 11 was likewise a layer of nitrile rubber the composition of which was generally similar to that employed for the backing 15 or for the filling 17 except that it contained considerably less carbon black and hence had a lower durometer reading. The composition of the stripping layer was as follows:

|  | Parts by weight |
|---|---|
| Hycar 1042 (a copolymer of butadiene and acrylonitrile sold by the B. F. Goodrich Chemical Company) | 100.00 |
| Carbon black | 50.00 |
| Accelerators | 2.50 |
| Retarder | .50 |
| Stearic acid | 0.75 |
| Zinc oxide | 12.00 |
| Sulphur | 1.00 |
| Plasticizer | 33.00 |
| Tackifier | 6.50 |
|  | 206.25 |

The elastomer backing layer 15 was provided in a thickness in the order of .017 inch in uncured condition with the dipped and frictioned fabric 16, plied thereover, having a thickness in the order of .020 inch. The filler 17 was then applied on top of the fabric 16 with the thickness of the filler selected in accordance with the desired final thickness of the engraving gum, the purpose of this filling layer being to provide a means by which engraving gums of different thicknesses can be readily formed from the same thickness and total number of components. In the specific example here illustrated and described, the thickness of this layer was .005 inch. The fabric layer 18, having a thickness of .020 inch, was then placed upon the filler layer 17 and the upper surface of this fabric was provided with the stripping coating or ply 19 having a thickness of .013 inch. The impression or printing surface 11 of the engraving gum with a thickness of .112 inch was then superposed and the assembly was placed in a curing press with the edges of the impression layer 11 confined to keep the plastic material thereof from flowing away from the proper location during the curing operation. The assembly was then subjected to sufficient heat and pressure to vulcanize the rubber after which the assembly was sufficiently cooled before removal from the press so that the impression layer was solidified and did not flow when the curing pressure was released.

Engraving gum made in accordance with this invention was found to give superior results in printing in that the ink spread more uniformly thereover than on the surfaces of gums employing conventional constructions in which the printing surface was made of natural or synthetic rubber. Likewise, it was found that there was less ink build-up and better transfer of the ink from the printing surface to the surface to be printed. Furthermore, the engraving gum had a longer life in use since it was more abrasion resistant and did not break down under printing pressures as quickly as did engraving gums employing natural or synthetic rubber impression surfaces. In addition, the solvents used in cleaning the impression surface did not attack the material of that surface in the improved plate or the supporting body so that there was no swelling or damage from this source. Finally, the phenomena known as cupping or halo, characteristic of printing effected with materials which have no, or only low resiliency, was not evidenced when employing the improved engraving gum.

It is not essential to the practice of the invention that the improved engraving gum be formed with two fabric reinforcements and the particular arrangement of those reinforcements with respect to a rubber backing and filling layer as described in the specific embodiment. Thus, in some installations, it is sufficient to employ a single fabric reinforcement without the filler layer or the second fabric reinforcement. In this case, it may be desirable that the fabric layer which is retained be that which has been rendered dimensionally stable by the use of the aforementioned treatment with a thermosetting resin. Alternatively, the fabric employed for such a layer may be itself formed of a material sufficiently dimensionally stable that no thermosetting resin need be employed thereon.

The invention is also not to be construed as restricted to having the backing of the engraving gum formed by an oil-resistant elastomer since, in some instances, it may be desirable that the elastomer layer 15 be itself covered with another material such as a thin flexible sheet of metal, fabric, or even a flexible plastic layer. It will further be apparent that, although specific proportions of particular materials have been designated as used in the preferred embodiment, the invention is not limited to use of these particular compositions so long as the elastomers are oil resistant, resilient, and of high enough modulus to provide rigidity adequate to prevent distortion of the printed impression under printing pressures. Moreover, the thicknesses of the several layers of material can be varied from those given in the specific embodiment and the range of petroleum wax employed in the impression layer to prevent ink build-up may be varied from the amount specified so long as this does not exceed 1 part per 100 parts of the resin.

It will be evident, therefore, that the invention is not to be considered as limited to the specific details of construction and materials as herein set forth for the specific embodiment except as may be required by the spirit and scope of the appended claims.

Having thus described the invention, we claim:

1. Sheet engraving gum comprising an impression layer of a carvable, oil-resistant, flexible, synthetic resin containing paraffin wax in the ratio of 1 part or less by weight to 100 parts by weight of the resin, and a supporting body including an elastomer coated substantially non-extensible fabric with the said layer strippably united with the said fabric.

2. Sheet engraving gum comprising an impression layer of plasticized polyvinyl chloride containing paraffin wax in the ratio of 1 part or less by weight to 100 parts by weight of the polyvinyl chloride, the said layer being strippably united with an elastomer coated substantially non-extensible fabric.

3. Sheet engraving gum comprising an impression layer of plasticized polyvinyl chloride containing paraffin wax in the ratio of 0.5 part by weight to 100 parts by weight of the polyvinyl chloride, the said layer being strippably united with an elastomer coated substantially non-extensible fabric.

4. Sheet engraving gum comprising an impression layer of plasticized polyvinyl chloride containing paraffin wax in the ratio of 1 part or less by weight of wax to 100 parts by weight of polyvinyl chloride, the said layer being strippably united with an elastomer coated substantially non-extensible fabric and a backing layer on said fabric comprising a carbon black reinforced copolymer of butadiene and acrylonitrile.

5. Sheet engraving gum comprising a backing layer of carbon black reinforced copolymer of butadiene and acrylonitrile, a layer of elastomer coated woven fabric on said backing layer, a filler layer of elastomer between said fabric and a second elastomer coated fabric, and an impression layer on the other side of the last-mentioned fabric which impression layer comprises plasticized polyvinyl chloride containing paraffin wax present in the amount of 1 part or less by weight of wax to 100 parts by weight of the polyvinyl chloride with the said impression layer strippably united to the said last-mentioned fabric by a layer of an elastomer having greater adhesion to the said impression layer than to the last-mentioned fabric.

References Cited by the Examiner

UNITED STATES PATENTS

| | | | |
|---|---|---|---|
| 2,028,712 | 1/36 | Swan et al. | 101—379 |
| 2,047,624 | 7/36 | Freedlander | 101—379 |
| 2,147,629 | 2/39 | Charch | 260—22 |
| 2,358,189 | 9/44 | Sprigg et al. | 101—379 |
| 2,578,664 | 12/51 | Beery et al. | 156—176 |
| 2,791,052 | 5/57 | Vasel | 101—401.1 |
| 2,792,321 | 5/57 | Fredericks | 161—88 |

FOREIGN PATENTS 662,180　12/51　Great Britain.

EARL M. BERGERT, *Primary Examiner.*

CARL F. KRAFFT, *Examiner.*